(12) United States Patent
Taguchi (10) Patent No.: US 7,791,701 B2
(45) Date of Patent: Sep. 7, 2010

(54) CIRCUIT FILM COMPRISING A FILM SUBSTRATE CONNECTED TO THE CONTROL BOARD, WIRE BOARD, AND DISPLAY PANEL

(75) Inventor: Minoru Taguchi, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 589 days.

(21) Appl. No.: 11/188,995

(22) Filed: Jul. 25, 2005

(65) Prior Publication Data
US 2006/0023153 A1 Feb. 2, 2006

(30) Foreign Application Priority Data
Jul. 28, 2004 (JP) ............... 2004-220740

(51) Int. Cl.
*G02F 1/1345* (2006.01)
(52) U.S. Cl. .................. 349/150; 349/149; 349/151; 349/152
(58) Field of Classification Search .......... 349/149–152
See application file for complete search history.

(56) References Cited

U.S. PATENT DOCUMENTS

| | | | |
|---|---|---|---|
| 6,417,897 B1 * | 7/2002 | Hashimoto | 349/65 |
| 6,853,430 B2 | 2/2005 | Murahashi et al. | |
| 6,924,794 B2 * | 8/2005 | Moon | 345/204 |
| 7,283,193 B2 * | 10/2007 | Sugimoto et al. | 349/149 |
| 2002/0176044 A1 * | 11/2002 | Lim | 349/149 |
| 2002/0180686 A1 | 12/2002 | Yuda et al. | |
| 2004/0012745 A1 * | 1/2004 | Ito | 349/150 |
| 2004/0061825 A1 * | 4/2004 | Sugimoto et al. | 349/149 |
| 2005/0083474 A1 * | 4/2005 | Park | 349/151 |
| 2006/0055649 A1 | 3/2006 | Yuda | |

FOREIGN PATENT DOCUMENTS

| | | |
|---|---|---|
| JP | 05-333358 | 12/1993 |
| JP | 3154810 B | 2/2001 |
| JP | 2002-287655 A | 10/2002 |
| JP | 2004-12807 A | 1/2004 |
| KR | 2002-0067009 A | 8/2002 |

OTHER PUBLICATIONS

Official communication issued in the corresponding Korean Patent Application No. 10-2005-68264, mailed on Oct. 25, 2006.

* cited by examiner

*Primary Examiner*—Andrew Schechter
*Assistant Examiner*—Charles Chang
(74) *Attorney, Agent, or Firm*—Keating & Bennett, LLP (57) ABSTRACT

A circuit film comprises a first circuit formed on a film substrate for outputting a driving signal to a display device, and a plurality of input lines formed on the film substrate. The display device includes a display panel which has first and second signal lines, a second-circuit film which has a second circuit for outputting a driving signal to the second signal line, and a control board for controlling the first and second circuits. The plurality of input lines include a first input line for inputting a control signal to the first circuit and a second input line for inputting a control signal to the second circuit. The film substrate is connected to the control board and the display panel such that a driving signal is input from the control board to the first and second circuits through the first and second input lines, respectively.

4 Claims, 11 Drawing Sheets

CIRCUIT FILM COMPRISING A FILM SUBSTRATE CONNECTED TO THE CONTROL BOARD, WIRE BOARD, AND DISPLAY PANEL

CROSS-REFERENCE TO RELATED APPLICATION

This Nonprovisional application claims priority under 35 U.S.C. §119 (a) on Patent Application No. 2004-220740 filed in Japan on Jul. 28, 2004, the entire contents of which are hereby incorporated by reference.

BACKGROUND OF THE INVENTION

1. Field of the Invention

The present invention relates to a circuit film and a display device including the same, for example, a liquid crystal display device.

2. Description of the Background Art

To drive a liquid crystal display device, a driver IC (integrated circuit) is mounted so as to be connected to lines on a liquid crystal panel. Examples of a method for mounting a driver IC include COG (Chip On Glass) technology wherein a driver IC is directly mounted on a glass substrate such that an electrode of the driver IC is connected to a wire on the glass substrate and SOF (System On Film) technology wherein a driver IC is mounted on a flexible printed circuit (FPC) and connected to a liquid crystal panel (see Japanese Patent No. 3154810). Further, a peripheral circuit mounting process is performed wherein a liquid crystal panel having a driver IC mounted thereon is connected to a control board having other circuits mounted thereon, e.g., a driver IC controller, a power supply circuit, etc.

Figure 9:
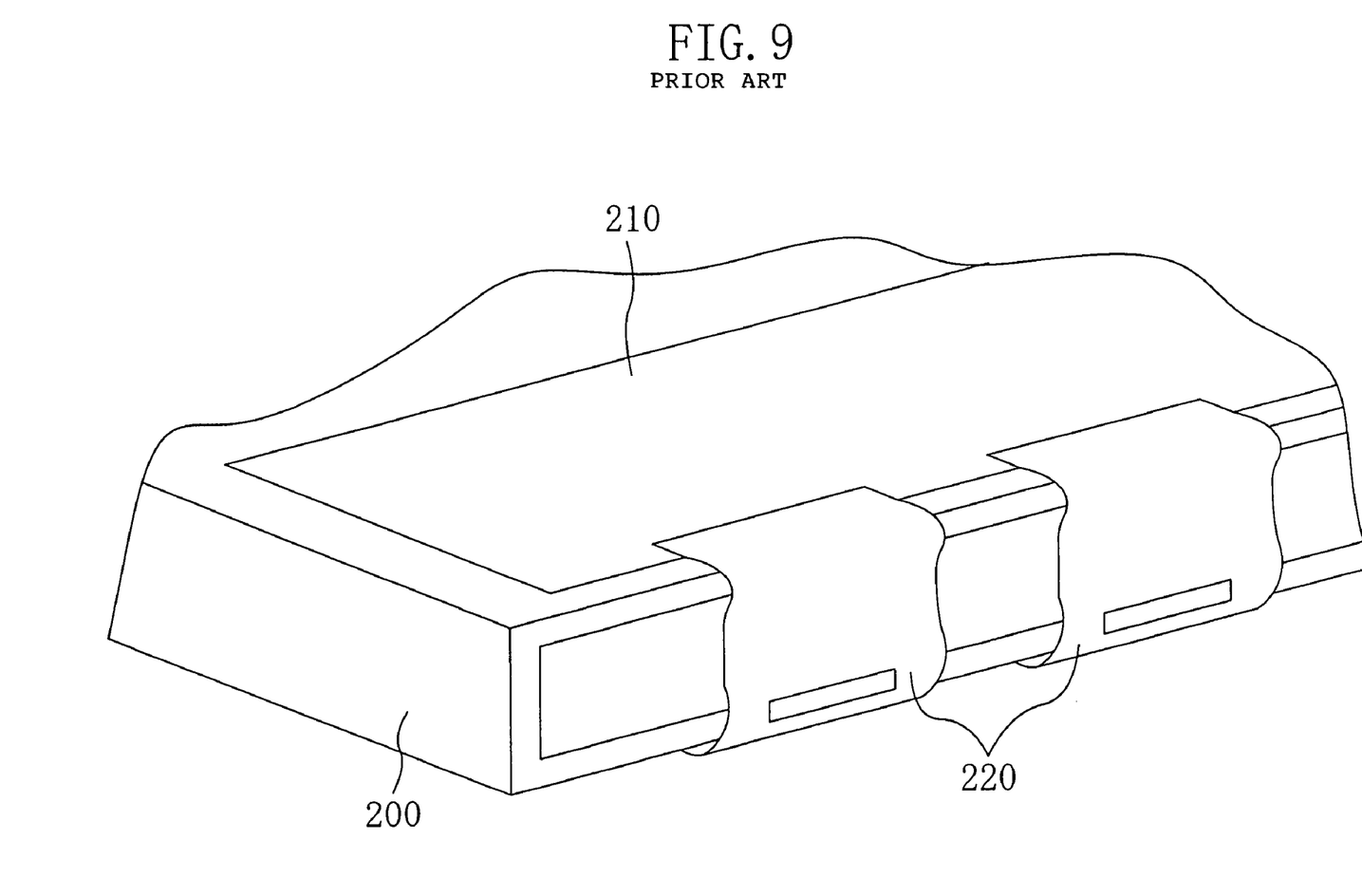
FIG. 9 is a perspective view schematically showing a conventional FPD.

FIG. 9 is a perspective view schematically showing a conventional FPD (flat panel display). In the FPD shown in FIG. 9, a control board 210 is placed on a back surface of a backlight unit 200, and a SOF (System On Film) 220 connected to the control board 210 is connected to a panel. However, as the thickness of a panel guide or the backlight unit 200 increases along with the increase in size of the FPD, it is necessary to elongate the SOF 220 in order to place the control board 210 on the back surface. Accordingly, the area of a film substrate of the SOF 220 increases, and the cost is inevitably increased. Further, since the exterior size of the control board 210 increases, the number of boards which can be cut out from a mother board is decreased, and as a result, the cost is increased.

In view of such, a recently-employed method is such that a portion of a board to which a SOF is connected is separated from a control board, and the separated portion of the board is placed at a side of a backlight unit. With this method, even if the thickness of the backlight unit is increased, elongation of the SOF can be avoided.

Figure 10:
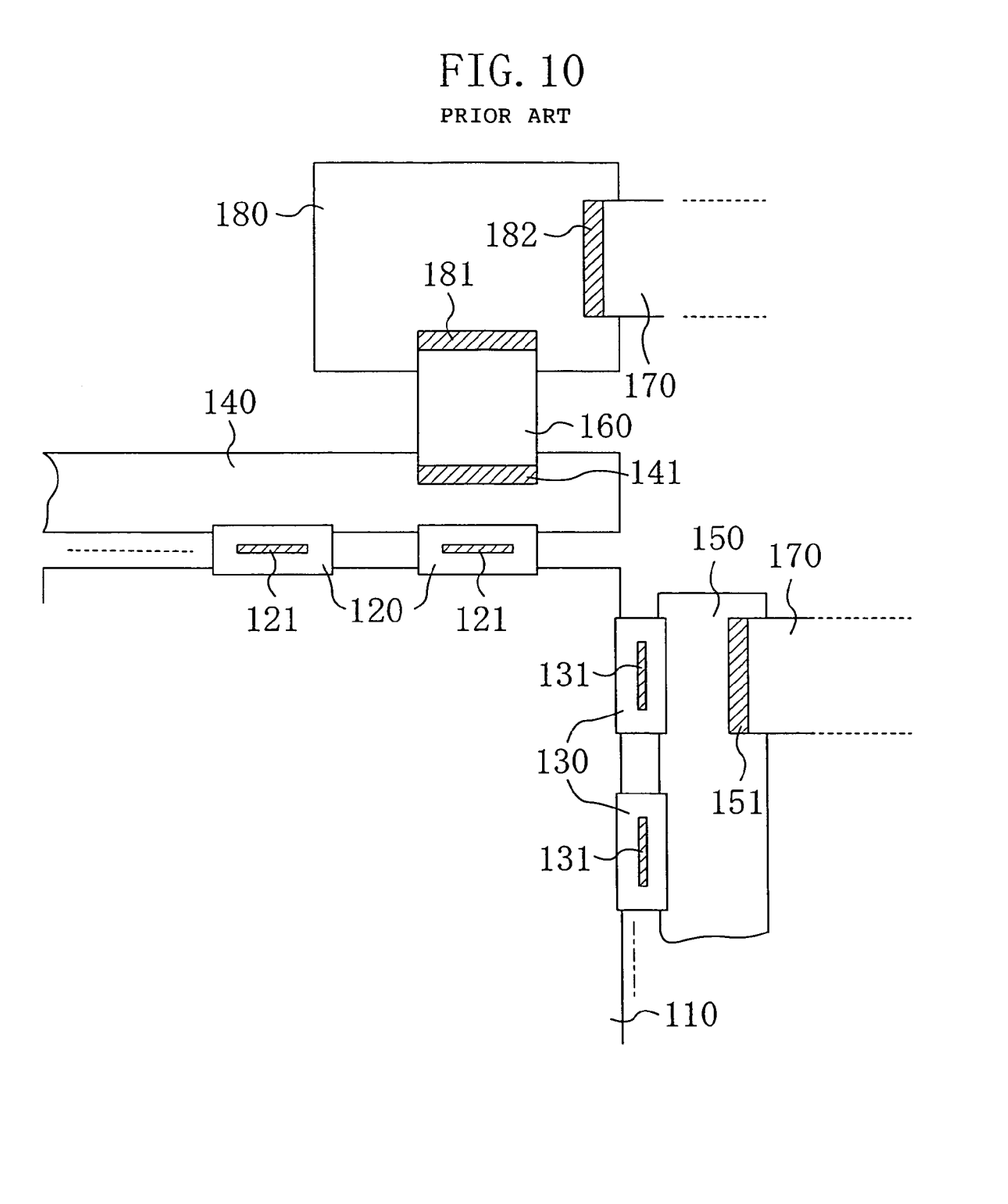
FIG. 10 is a plan view schematically showing a board-separated FPD.
Figure 11:
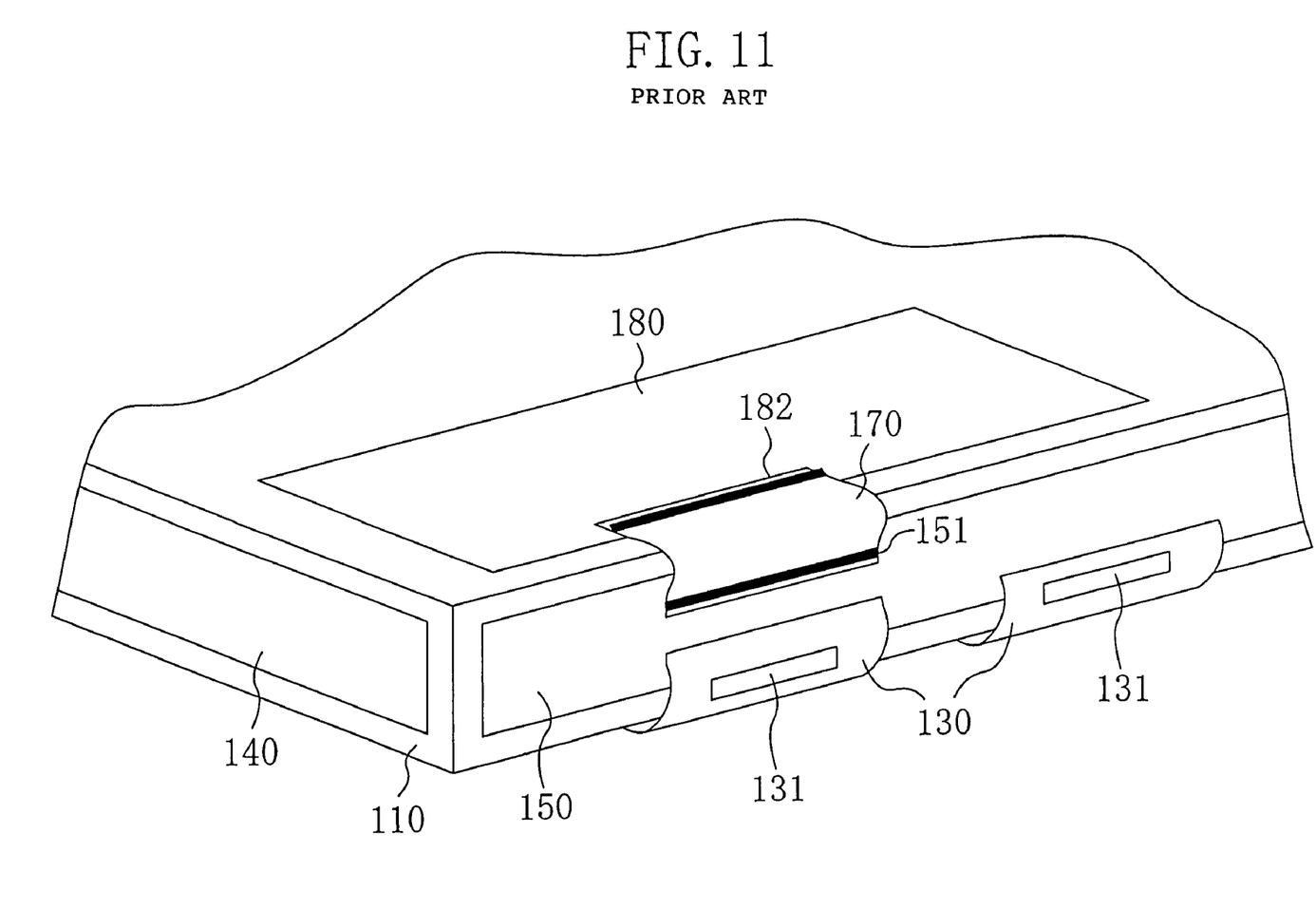
FIG. 11 is a perspective view schematically showing the board-separated FPD.

FIG. 10 is a plan view schematically showing a board-separated FPD. FIG. 11 is a perspective view of the board-separated FPD. It should be noted that a source SOF 120 and an input FPC 160 are omitted from FIG. 11.

At the periphery of a liquid crystal display panel, the source SOF 120 including a source driver IC 121 mounted thereon and a gate SOF 130 including a gate driver IC 131 mounted thereon are connected. The source SOF 120 and the gate SOF 130 are connected to a source board 140 and a gate board 150, respectively. The source board 140 and the gate board 150 are connected to a control board 180 through the input FPCs 160 and 170, respectively. The input FPCs 160 and 170 are connected to the boards 140, 150 and 180 by connectors 141, 151, 181 and 182 formed thereon. The control board 180 is placed on a back surface of a backlight unit 110. The boards 140 and 150, which are separated from the control board 180, are placed in a dead space at a side of the backlight unit 110. As a result, the exterior of the control board 180 is optimized, and the board area is reduced. Accordingly, the increase in cost is suppressed. Further, elongation of the SOFs 120 and 130 is avoided, and the cost is decreased.

However, since the control board 180 is separated from the boards 140 and 150, it is necessary to additionally provide an exclusive interface for connecting these separated elements (for example, a FPC, a flexible flat cable, etc.). Adding this interface causes another problem, i.e., an increase in cost. Specifically, the input FPCs 160 and 170 are necessary, and accordingly, the connectors 141, 151, 181 and 182 for connecting the input FPCs 160 and 170 to the boards 140, 150 and 180 are also necessary.

SUMMARY OF THE INVENTION

An objective of the present invention is to reduce the number of components for the purpose of cost reduction.

According to the present invention, a circuit film is connected not only to a display panel but also to a control board, whereby an exclusive interface is unnecessary. The present invention includes the following circuit films according to the first to fourth aspects. The present invention further includes the following display devices according to the first to fourth aspects.

A circuit film according to the first aspect of the present invention comprises: a film substrate; a first circuit formed on the film substrate for outputting a driving signal to a display device; and a plurality of input lines formed on the film substrate. The display device includes a display panel which has at least a first signal line and a second signal line, a second-circuit film (a film for a second circuit) which has a second circuit for outputting a driving signal to the second signal line, and a control board for controlling the first and second circuits. The film substrate has a region which is connected to the control board and a region which is connected to the display panel. The plurality of input lines include at least a first input line for inputting a control signal to the first circuit and a second input line for inputting a control signal to the second circuit. The film substrate is connected to the control board and the display panel such that a driving signal is input from the control board to the first and second circuits through the first and second input lines, respectively.

A circuit film according to the second aspect of the present invention comprises: a film substrate; a first circuit formed on the film substrate for outputting a driving signal to a display device; and a plurality of input lines formed on the film substrate. The display device includes a display panel which has a first signal line, a second signal line and a third signal line, a second-circuit film (a film for a second circuit) which has a second circuit for outputting a driving signal to the second signal line, a third-circuit film (a film for a third circuit) which has a third circuit for outputting a driving signal to the third signal line, and a control board for controlling the first, second and third circuits. The film substrate has a region which is connected to the control board and a region which is connected to the display panel. The plurality of input lines include a first input line for inputting a control signal to the first circuit, a second input line for inputting a control signal to the second circuit, and a third input line for inputting a control signal to the third circuit. The film substrate is connected to the control board and the display panel such that a driving signal is input from the control board to the first, second and third circuits through the first, second and third input lines, respectively.

A circuit film according to the third aspect of the present invention comprises: a film substrate; a first circuit formed on the film substrate for outputting a driving signal to a display device; and a plurality of input lines formed on the film substrate. The display device includes a display panel which has a first signal line and a second signal line, a second-circuit film (a film for a second circuit) which has a second circuit for outputting a driving signal to the second signal line, a wire board which has a second-circuit line (a line for the second circuit) for inputting a control signal to the second circuit, and a control board for controlling the first and second circuits. The film substrate has a region which is connected to the wire board and a region which is connected to the display panel. The plurality of input lines include a first input line for inputting a control signal to the first circuit and a second input line for inputting a control signal to the second-circuit line. The film substrate is connected to the display panel, the wire board, and the control board such that a control signal is input from the control board to the first circuit through the first signal line, and a control signal is input from the control board to the second circuit through the second input line and the second-circuit line.

A circuit film according to the fourth aspect of the present invention comprises: a film substrate; a first circuit formed on the film substrate for outputting a driving signal to a display device; and a plurality of input lines formed on the film substrate. The display device includes a display panel which has a first signal line, a second signal line and a third signal line, a second-circuit film (a film for a second circuit) which has a second circuit for outputting a driving signal to the second signal line, a wire board which has a second-circuit line (a line for the second circuit) for inputting a control signal to the second circuit, a third-circuit film (a film for a third circuit) which has a third circuit for outputting a driving signal to the third signal line, and a control board for controlling the first, second and third circuits. The display panel includes a third-circuit line (a line for the third circuit) for inputting a control signal to the third circuit. The film substrate has a region which is connected to the wire board and a region which is connected to the display panel. The plurality of input lines include a first input line for inputting a control signal to the first circuit, a second input line for inputting a control signal to the second-circuit line, and a third input line for inputting a control signal to the third-circuit line. The film substrate is connected to the display panel, the wire board, and the control board such that a control signal is input from the control board to the first circuit through the first signal line, a control signal is input from the control board to the second circuit through the second input line and the second-circuit line, and a control signal is input from the control board to the third circuit through the third input line and the third-circuit line.

A display device according to the first aspect of the present invention comprises: a display panel which has a first signal line and a second signal line; a first-circuit film (a film for a first circuit) which has a film substrate and a first circuit formed on the film substrate for outputting a driving signal to the first signal line; a second-circuit film (a film for a second circuit) which has a second circuit for outputting a driving signal to the second signal line; and a control board for controlling the first and second circuits. The first-circuit film has a first input line for inputting a control signal to the first circuit and a second input line for inputting a control signal to the second circuit. The film substrate is connected to the control board and the display panel such that a control signal is input from the control board to the first circuit and the second circuit through the first input line and the second input line, respectively.

A display device according to the second aspect of the present invention comprises: a display panel which has a first signal line, a second signal line, and a third signal line; a first-circuit film (a film for a first circuit) which has a film substrate and a first circuit formed on the film substrate for outputting a driving signal to the first signal line; a second-circuit film (a film for a second circuit) which has a second circuit for outputting a driving signal to the second signal line; a third-circuit film (a film for a third circuit) which has a third circuit for outputting a driving signal to the third signal line; and a control board for controlling the first, second and third circuits. The first-circuit film has a first input line for inputting a control signal to the first circuit, a second input line for inputting a control signal to the second circuit, and a third input line for inputting a control signal to the third circuit. The film substrate is connected to the control board and the display panel such that a control signal is input from the control board to the first, second and third circuits through the first, second and third input lines, respectively.

A display device according to the third aspect of the present invention comprises: a display panel which has a first signal line and a second signal line; a first-circuit film (a film for a first circuit) which has a film substrate and a first circuit formed on the film substrate for outputting a driving signal to the first signal line; a second-circuit film (a film for a second circuit) which has a second circuit for outputting a driving signal to the second signal line; a wire board which has a second-circuit line (a line for the second circuit) for inputting a signal to the second circuit; and a control board for controlling the first and second circuits. The first-circuit film has a first input line for inputting a control signal to the first circuit and a second input line for inputting a control signal to the second circuit. The film substrate is connected to the control board, the wire board, and the display panel such that a control signal is input from the control board to the first circuit through the first input line, and a control signal is input from the control board to the second circuit through the second input line and the second-circuit line.

A display device according to the fourth aspect of the present invention comprises: a display panel which has a first signal line, a second signal line, and a third signal line; a first-circuit film (a film for a first circuit) which has a film substrate and a first circuit formed on the film substrate for outputting a driving signal to the first signal line; a second-circuit film (a film for a second circuit) which has a second circuit for outputting a driving signal to the second signal line; a wire board which has a second-circuit line (a line for the second circuit) for inputting a signal to the second circuit; a third-circuit film (a film for a third circuit) which has a third circuit for outputting a driving signal to the third signal line; and a control board for controlling the first, second and third circuits. The display panel further includes a third-circuit line (a line for the third circuit) for inputting a control signal to the third circuit. The first-circuit film has a first input line for inputting a control signal to the first circuit, a second input line for inputting a control signal to the second circuit, and a third input line for inputting a control signal to the third circuit. The film substrate is connected to the control board, the wire board, and the display panel such that a control signal is input from the control board to the first circuit through the first input line, a control signal is input from the control board to the second circuit through the second input line and the second-circuit line, and a control signal is input from the control board to the third circuit through the third input line and the third-circuit line.

DESCRIPTION OF THE PREFERRED EMBODIMENTS

Hereinafter, embodiments of the present invention will be described with reference to the drawings. In the embodiments below, a liquid crystal display device incorporating a liquid crystal panel is described as an example of a display device. However, the display device of the present invention is not limited to the liquid crystal display device. For example, the display device may be an inorganic or organic EL (Electro Luminescence) display device. It should be noted that the liquid crystal display device may be any of a transmission-type device, a reflection-type device, and a transreflective-type device. It should be further noted that, in the descriptions below, a suffixed alphabet of a reference numeral is sometimes omitted, and only Arabic numerals are shown for generic representation of equivalent components. For example, a first source driver IC 21a and a second source driver IC 21b are sometimes generically expressed as "source driver IC(s) 21".

Embodiment 1

Figure 1:
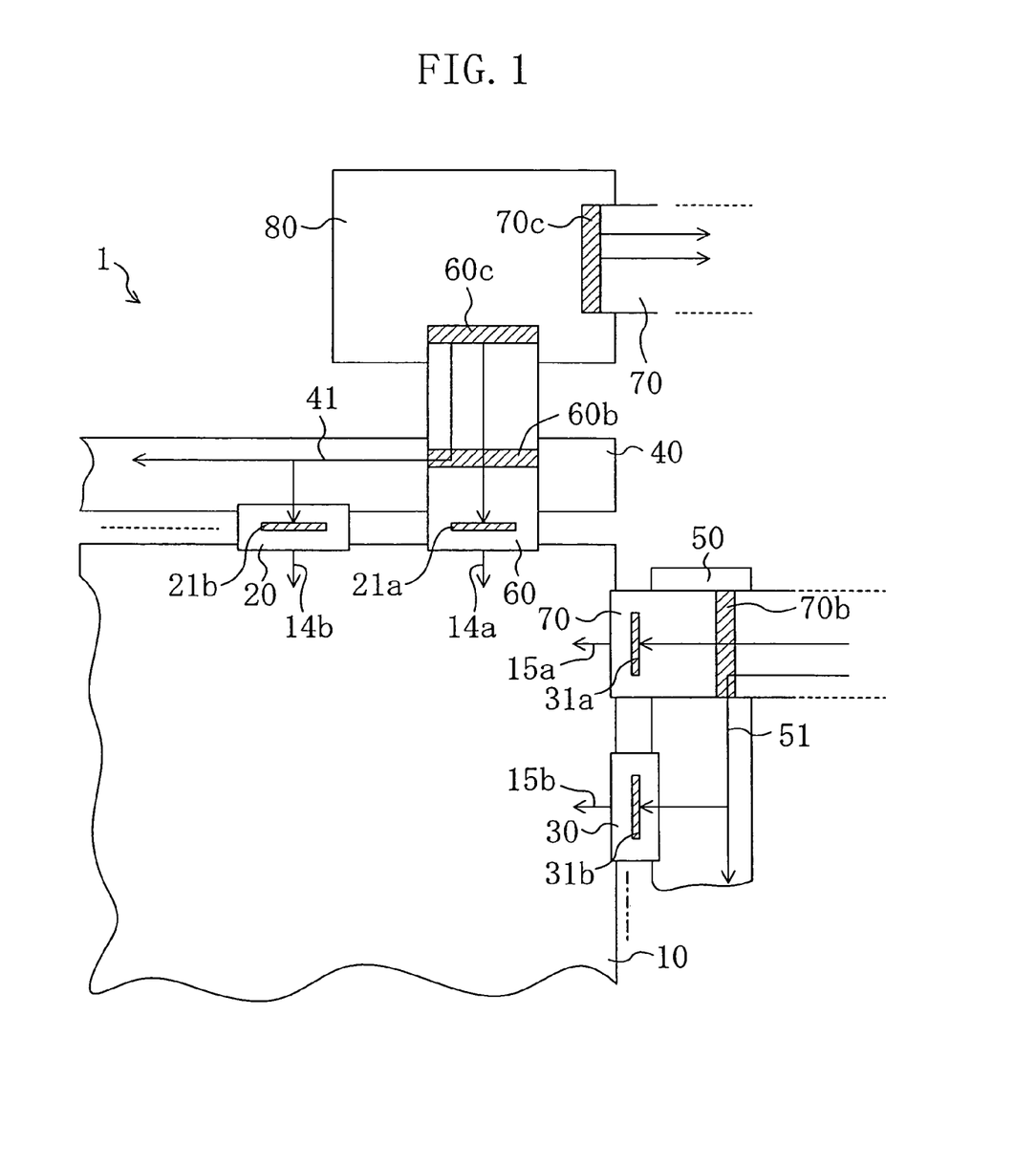
FIG. 1 is a plan view schematically showing a liquid crystal display device 1 of embodiment 1.

In embodiment 1, a circuit film and display device according to the third aspect of the present invention are described. FIG. 1 is a plan view schematically showing liquid crystal display device 1 of embodiment 1.

Elements of the circuit film and display device according to the third aspect of the present invention correspond to the following elements of embodiment 1:

Circuit film of the third aspect: first source SOF 60, first gate SOF 70;
Second-circuit film: second source SOF 20, second gate SOF 30;
First circuit: first source driver IC 21a, first gate driver IC 31a;
Second circuit: second source driver IC 21b, second gate driver IC 31b;
First signal line: first source line 14a, first gate line 15a;
Second signal line: second source line 14b, second gate line 15b;
Second-circuit line: source IC line 41, gate IC line 51;
Wire board: source PCB 40, gate PCB 50;
First input line: input line 23; and
Second input line: source IC input line 24.

A liquid crystal display device 1 includes: a liquid crystal panel 10; a first source SOF 60 and a second source SOF 20 which are connected to the liquid crystal panel 10 at the periphery thereof; a first gate SOF 70 and a second gate SOF 30 which are connected to the liquid crystal panel 10 at the periphery thereof; a source PCB (printed circuit board) 40 which is connected to both the second source SOF 20 and the first source SOF 60; a gate PCB 50 which is connected to both the second gate SOF 30 and the first gate SOF 70; and a control board 80. It should be noted that although only one strip of second source SOF 20 and only one strip of second gate SOF 30 are shown in FIG. 1 for clarity of illustration, the liquid crystal display device 1 typically includes a plurality of SOFs 20 and 30 around the periphery of the liquid crystal panel 10.

The liquid crystal panel 10 includes a TFT (Thin Film Transistor) substrate (not shown), a color filter substrate (not shown) facing the TFT substrate, and a liquid crystal layer (not shown) between the substrates. The TFT substrate includes a plurality of source lines which extend in parallel to each other, a plurality of gate lines which extend in parallel to each other and cross the plurality of source lines, TFTs which are arranged in a matrix so as to be electrically connected to the source lines and the gate lines, and pixel electrodes which are connected to the gate lines and the source lines through the TFTs. Terminals of the source lines and gate lines are formed around the periphery of the TFT substrate.

Among the plurality of source lines, source lines which are connected to the first source SOFs 60 are referred to as "first source lines 14a", and source lines which are connected to the second source SOFs 20 are referred to as "second source lines 14b". As well, among the plurality of gate lines, gate lines which are connected to the first gate SOFs 70 are referred to as "first gate lines 15a", and gate lines which are connected to the second gate SOFs 30 are referred to as "second gate lines 15b".

The color filter substrate includes a color filter of red, green and blue, and a common electrode covering the color filter. The TFT substrate and the color filter substrate have rubbed alignment films over the surfaces on the liquid crystal layer side.

The first and second source SOFs 60 and 20 and the first and second gate SOFs 70 and 30 each have a film substrate made of glass, a polyimide resin, or the like, driver ICs 21 and 31 mounted on the film substrate, and a wire pattern formed of copper foil, or the like, on the film substrate. The wire pattern is formed by a plurality of lines using a plating method or a casting method. It should be noted that the first and second source SOFs 60 and 20 and the first and second gate SOFs 70 and 30 may have other various components in addition to the driver ICs.

The source PCB 40 has a source IC line 41 for inputting a control signal to a second source driver IC 21b mounted on the second source SOF 20. As well, the gate PCB 50 has a gate IC line 51 for inputting a control signal to a second gate driver IC 31b mounted on the second gate SOF 30.

The control board 80 has circuits for supplying control signals for controlling the source driver IC 21 and the gate driver IC 31 and other various signals, such as a power supply voltage, etc.

Figure 2:
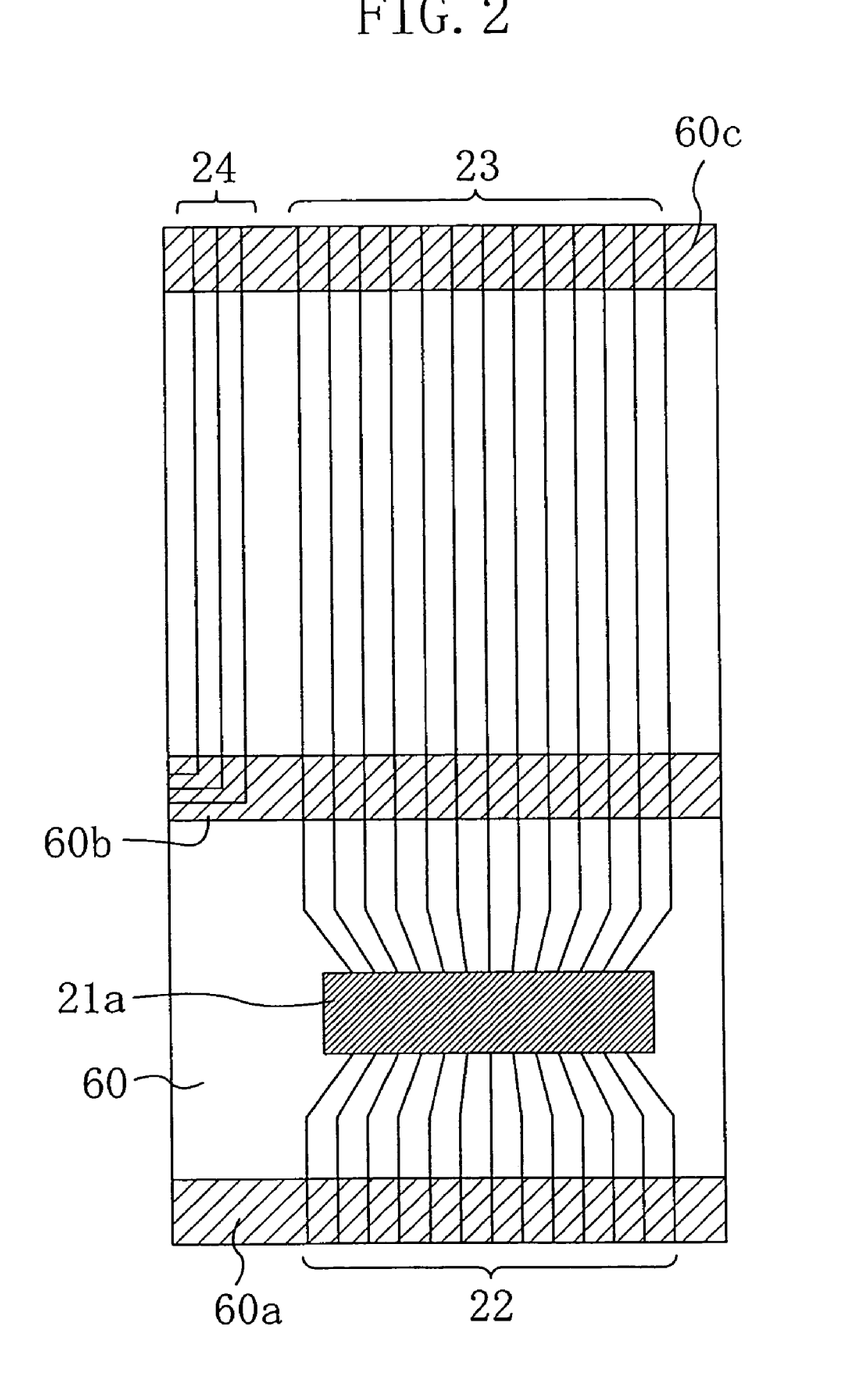
FIG. 2 is a plan view schematically showing a first source SOF 60.
Figure 3:
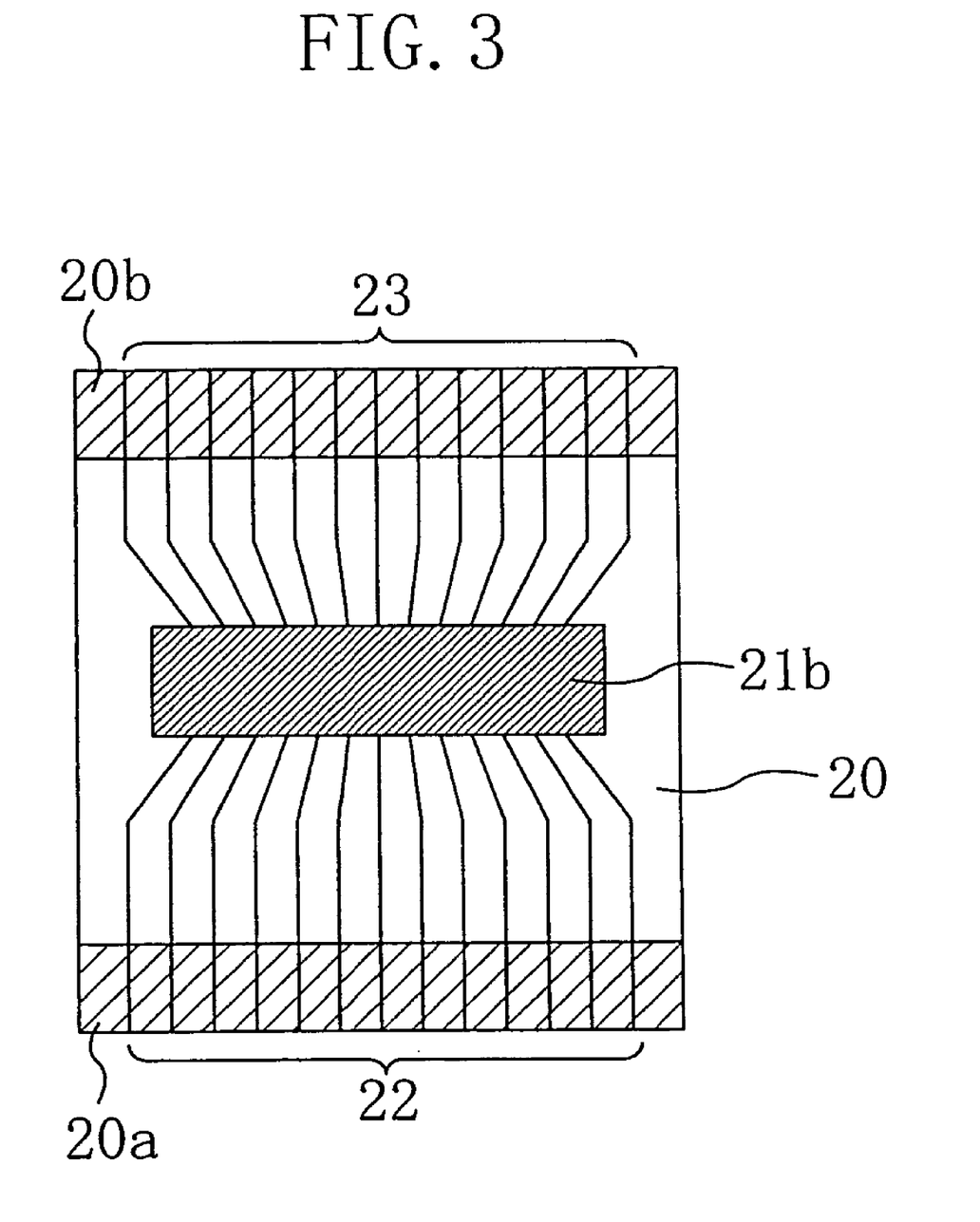
FIG. 3 is a plan view schematically showing a second source SOF 20.

FIG. 2 is a plan view schematically showing the first source SOF 60. FIG. 3 is a plan view schematically showing the second source SOF 20. In the first place, the second source SOF 20 shown in FIG. 3 is described. The second source SOF 20 has a second source driver IC 21b, an output line 22 for outputting a signal from the second source driver IC 21b to the second source line 14b of the liquid crystal panel 10, and an input line 23 for inputting a signal to the second source driver IC 21b. The second source SOF 20 further has a panel side terminal 20a for connecting the output line 22 to the second source line 14b of the liquid crystal panel 10 and a PCB side terminal 20b for connecting the input line 23 to the source IC line 41 of the source PCB 40.

Meanwhile, the first source SOF 60 has a first source driver IC 21a, an output line 22, an input line 23, a panel side terminal 60a and a PCB side terminal 60b as does the second source SOF 20. It should be noted that the input line 23 of the first source SOF 60 is longer than the input line 23 of the second source SOF 20 so as to be connected to the control board 80 at a control board side terminal 60c. The first source SOF 60 further includes a source IC input line 24 for inputting a control signal to the source IC line 41 formed on the source PCB 40. The source IC input line 24 is connected to the source IC line 41 at the PCB side terminal 60b and to the control board 80 at the control board side terminal 60c.

Since the amount of information for visual representation has recently been increasing, a larger number of pins are required at a terminal of an interface for connecting the control board 80 and the PCBs 40 and 50 as for signal transmission between these components. In the case of a short pitch between terminals, a reduction of the board area and high density layout are possible. However, in the case of a connection using a connector or a solder connection of soldering a FPC directly onto a board, the limit of terminal pitch is about 400 μm at the smallest.

In embodiment 1, the control board 80 and the PCBs 40 and 50 are connected through the SOFs 60 and 70. The SOFs 60 and 70 are produced by, for example, forming Cr and Ni layers on a polyimide tape substrate by sputtering and plating the resultant structure with copper. Since the copper foil of the SOFs 60 and 70 can be formed to be thin, the tape wiring can be formed at a finer pitch. For example, the copper foil can be formed to have a thickness of about 8 μm, and accordingly, the wiring pitch (interval of wires) can be set to about 30 μm. Further, when the terminals of wires are arranged in a staggered configuration, a fine pitch junction is possible.

Thus, when the SOFs 60 and 70 are employed in substitution for a FPC, the signal transfer terminal pitch between the control board 80 and the PCBs 40 and 50 can be reduced as short as the input pitch of the SOFs 60 and 70 on the liquid crystal panel side. This greatly contributes to reduction of the board area and high density layout over the board.

In embodiment 1, the SOFs 20, 30, 60 and 70 are connected to the liquid crystal panel 10, the PCBs 40 and 50, and the control board 80 using an anisotropic conductive film (ACF). With this structure, a connector, which leads to an increase in cost, is unnecessary. Using an anisotropic conductive film for connection also greatly contributes to environmental protection, whereas using a solder material which contains lead for connection has been unfavorably criticized in view of environmental protection.

Next, a route of a signal transferred through the liquid crystal display device 1 is described. A control signal output from the control board 80 is input to the input line 23 and the source IC input line 24 of the first source SOF 60. A control signal input to the input line 23 is input to the first source driver IC 21a of the first source SOF 60. Meanwhile, a control signal input to the source IC input line 24 is input to the source IC line 41 at the PCB side terminal 60b and then input to the second source driver IC 21b of the second source SOF 20. With this, a driving signal is output from the second source driver IC 21b to the second source line 14b of the liquid crystal panel 10.

The first and second gate SOFs 70 and 30 have the same structure as that of the first and second source SOFs 60 and 20. Briefly describing, the first gate SOF 70 has output and input lines and a gate IC input line for inputting a control signal to the gate IC line 51. A control signal output from the control board 80 is input to the input line and the gate IC input line at a control board side terminal 70c. The control signal input to the input line is input to a first gate driver IC 31a of the first gate SOF 70. Meanwhile, the control signal input to the gate IC input line is input to the second gate driver IC 31b of the second gate SOF 30 through the gate IC line 51 of the gate PCB 50. Thus, a driving signal is output from the second gate driver IC 31b to the second gate lines 15b of the liquid crystal panel 10.

The SOFs 20, 30, 60 and 70 may have a line for supplying a supply voltage and/or a line for inputting a common signal to a common electrode formed in the color filter substrate of the liquid crystal panel 10.

Figure 4:
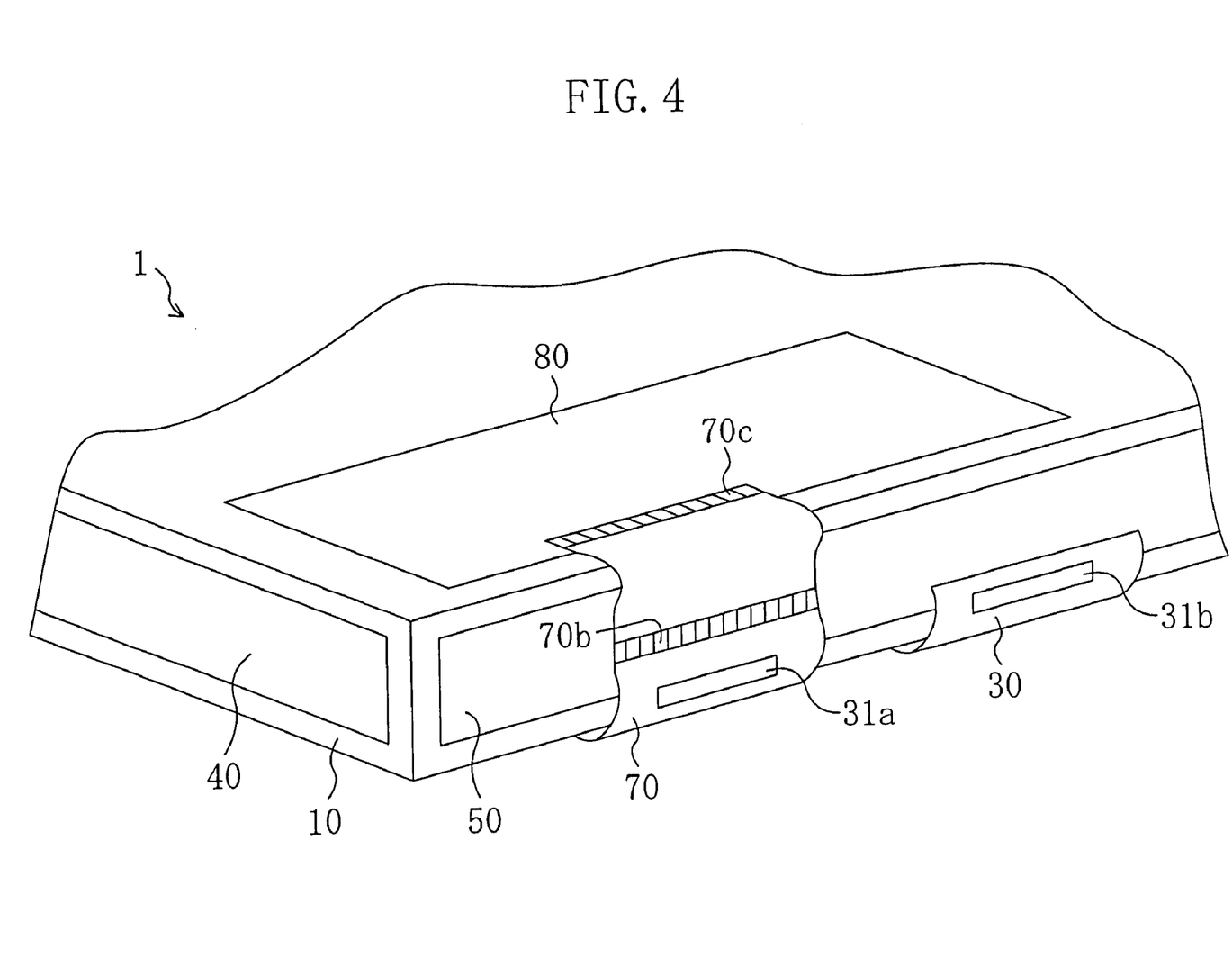
FIG. 4 is a perspective view schematically showing the liquid crystal display device 1 of embodiment 1.

FIG. 4 is a perspective view schematically showing the liquid crystal display device 1 of embodiment 1. It should be noted that the first and second source SOFs 60 and 20 are omitted from FIG. 4. According to embodiment 1, the PCBs 40 and 50 can be accommodated in a dead space created by a panel guide and/or a backlight unit on a side surface of a module. Therefore, the external dimensions of the SOFs 20 and 30 can be decreased, and accordingly, the decrease in cost is possible. When the SOFs 60 and 70 are used for ACF connection between the control board 80 and the PCBs 40 and 50, the number of interface exclusive components, such as FPCs, connectors, etc., can be reduced, and a large reduction in cost can be expected. Since the control board 80 is separated from the PCBs 40 and 50, each board can be formed to have optimum dimensions, and this leads to a reduction in cost of the board.

Next, a process of producing the liquid crystal display device 1 of embodiment 1 is described. It should be noted that the liquid crystal panel 10, the first and second source SOFs 60 and 20, the first and second gate SOFs 70 and 30, the source PCB 40, and the gate PCB 50 each can be produced by a known method, and therefore, the descriptions thereof are herein omitted.

At the first step, ACF is fixed around the periphery of the liquid crystal panel 10. An alignment mark of the second source SOF 20 is adjusted with respect to an alignment mark of the liquid crystal panel 10, and the second source SOF 20 is tentatively fixed at the periphery of the liquid crystal panel 10. An alignment mark of the first source SOF 60 is adjusted with respect to an alignment mark of the liquid crystal panel 10, and the first source SOF 60 is tentatively fixed at the periphery of the liquid crystal panel 10. In the same way, the first and second gate SOFs 70 and 30 are tentatively fixed at the periphery of the liquid crystal panel 10. The SOFs 20, 30, 60 and 70 are heated to about 200° C. with a pressure of 2 MPa to be undetachably connected to the liquid crystal panel 10.

Then, ACF is fixed to the source PCB 40 and the gate PCB 50. Alignment marks of the second source SOF 20 and the first source SOF 60 are adjusted with respect to an alignment mark of the source PCB 40, and the first and second source SOFs 60 and 20 are tentatively fixed to the source PCB 40. In the same way, the first and second gate SOFs 70 and 30 are tentatively fixed to the gate PCB 50. The SOFs 20, 30, 60 and 70 are heated to about 200° C. with a pressure of 2 MPa to be undetachably connected to the PCBs 40 and 50.

Then, ACF is fixed to the control board 80. An alignment mark of the first source SOF 60 is adjusted with respect to an alignment mark of the control board 80, and the first source SOF 60 is tentatively fixed to the control board 80. In the same way, the first gate SOF 70 is tentatively fixed to the control board 80. The SOFs 60 and 70 are heated to about 200° C. with a pressure of 2 MPa to be undetachably connected to the control board 80.

In the above example of embodiment 1, the first and second source SOFs 60 and 20 are tentatively fixed to the source PCB 40 after the SOFs 20, 30, 60 and 70 have been undetachably fixed to the liquid crystal panel 10. However, the first and second gate SOFs 70 and 30 may be undetachably fixed to the liquid crystal panel 10 after the first and second source SOFs 60 and 20 have been undetachably fixed to the source PCB 40. Alternatively, the first source SOF 60 and the second source SOF 20 may be connected to the source PCB 40 at different steps.

Embodiment 2

Figure 5:
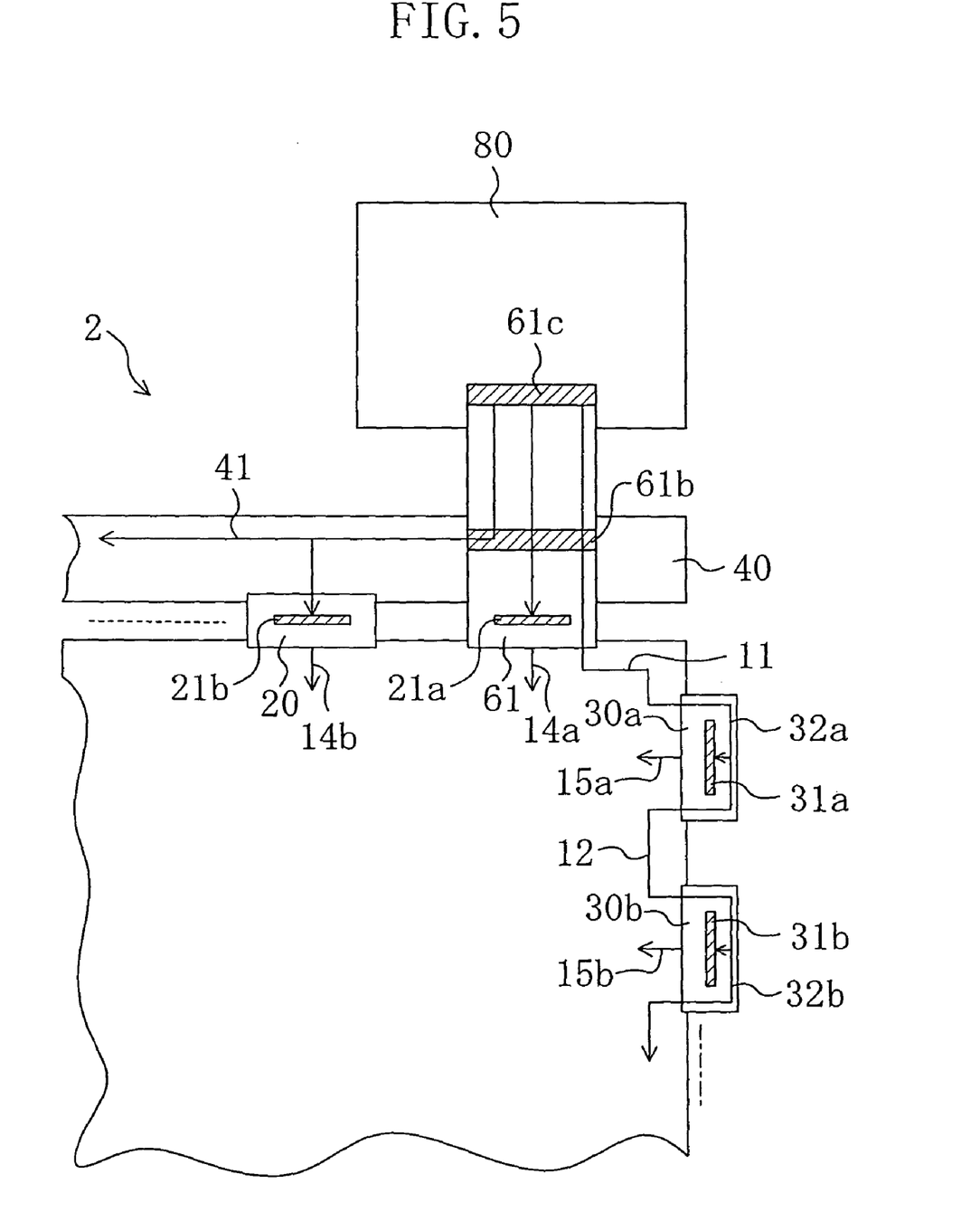
FIG. 5 is a plan view schematically showing a liquid crystal display device 2 of embodiment 2.

In embodiment 2, a circuit film and display device according to the fourth aspect of the present invention are described. FIG. 5 is a plan view schematically showing a liquid crystal display device 2 of embodiment 2. The elements same as those of embodiment 1 are denoted by the same reference numerals, and the descriptions thereof are herein omitted.

Elements of the circuit film and display device according to the fourth aspect of the present invention correspond to the following elements of embodiment 2:

Circuit film of the fourth aspect: first source SOF 61;
Second-circuit film: second source SOF 20;
Third-circuit film: first gate SOF 30a, second gate SOF 30b;
First circuit: first source driver IC 21a;
Second circuit: second source driver IC 21b;
Third circuit: first gate driver IC 31a, second gate driver IC 31b;
First signal line: first source line 14a;
Second signal line: second source line 14b;
Third signal line: first gate line 15a, second gate line 15b;
Second-circuit line: source IC line 41;
Third-circuit line: relay line 11;
Wire board: source PCB 40;
First input line: input line 23;
Second input line: source IC input line 24; and
Third input line: gate IC input line 25.

Among the plurality of source lines, source lines which are connected to the first source SOFs 61 are referred to as "first source lines 14a", and source lines which are connected to the second source SOFs 20 are referred to as "second source lines 14b". As well, among the plurality of gate lines, gate lines which are connected to the first gate SOFs 30a are referred to as "first gate lines 15a", and gate lines which are connected to the second gate SOFs 30b are referred to as "second gate lines 15b".

The liquid crystal display device 2 of embodiment 2 does not have the gate PCB 50 of embodiment 1. A control signal which is to be supplied to the gate driver IC 31 of the second gate SOF 30 is input from the liquid crystal panel 10. In other words, the first gate SOF 30a has a first relay line 32a for transferring a control signal to an adjacent second gate SOF 30b. The second gate SOF 30b has a second relay line 32b for transferring a control signal to an adjacent third gate SOF (not shown). The liquid crystal panel 10 has a panel side relay line 12 for connecting the relay lines 32a and 32b of adjacent gate SOFs 30a and 30b.

Figure 6:
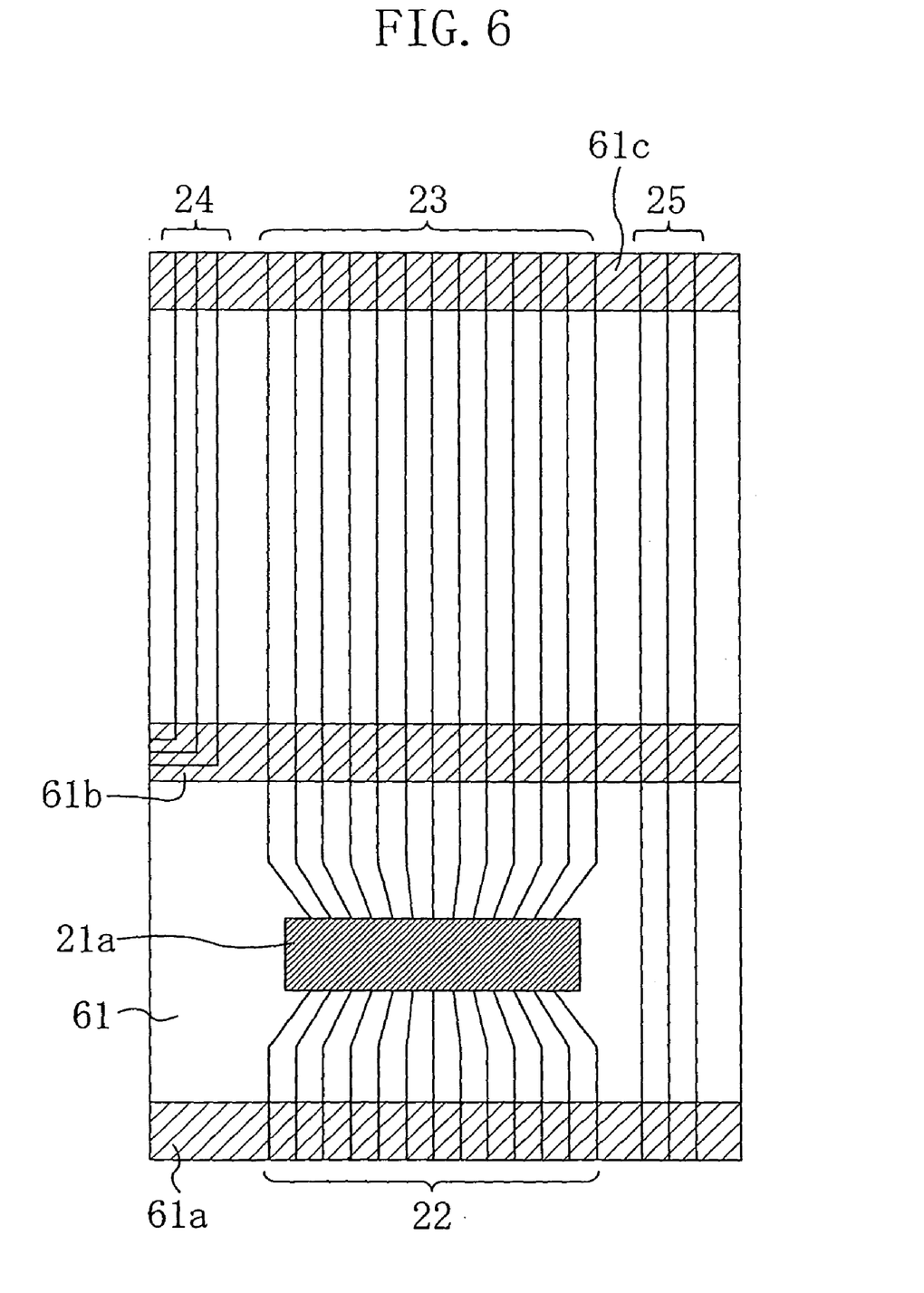
FIG. 6 is a plan view schematically showing a first source SOF 61 of embodiment 2.

FIG. 6 is a plan view schematically showing a first source SOF 61 of embodiment 2. The first source SOF 61 has a first source driver IC 21a, an output line 22, an input line 23, a source IC input line 24, a panel side terminal 61a, a PCB side terminal 61b, and a control board side terminal 61c as does the first source SOF 60 of embodiment 1. Thus, by connecting the first source SOF 61 of embodiment 2 to the liquid crystal panel 10, the source PCB 40 and the control board 80, a control signal is input to the source driver ICs 21 of the first and second source SOFs 61 and 20, and a driving signal is output from the source driver IC 21 to the source line 14 of the liquid crystal panel 10.

The first source SOF 61 of embodiment 2 further includes a gate IC input line 25 for inputting a control signal to the gate driver IC 31 of the gate SOF 30. The liquid crystal panel 10 has a relay line 11 which is connected to the first relay line 32a of the first gate SOF 30a. The first source SOF 61 is connected to the liquid crystal panel 10. As a result, the gate IC input line 25 is connected to the relay line 11 at the panel side terminal 61a. The gate IC input line 25 is connected to the control board 80 at the control board side terminal 60c. Therefore, by connecting the first source SOF 61 to the control board 80, a control signal is input from the control board 80 to the gate driver IC 31 through the first source SOF 61.

According to embodiment 2, the gate PCB is unnecessary, and therefore, the component cost of PCBs can be reduced. Further, a control signal is input not only to the source driver IC 21 but also to the gate driver IC 31 through the first source SOF 61. Thus, the first gate SOF 70 of embodiment 1 is unnecessary, and accordingly, the component cost can be decreased. Furthermore, the production process is simple as compared with the liquid crystal display device 1 of embodiment 1, and therefore, the production efficiency is improved.

Embodiment 3

Figure 7:
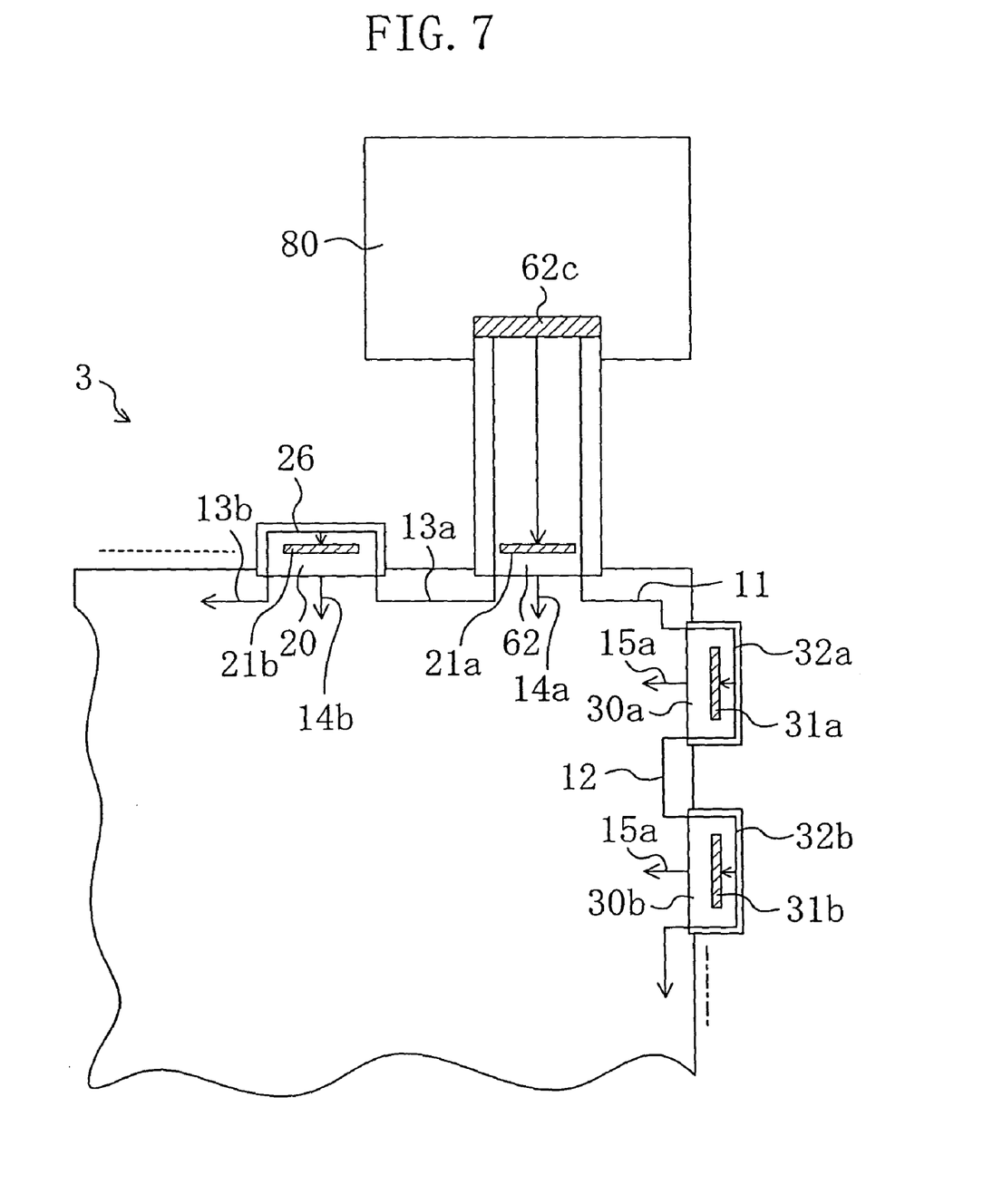
FIG. 7 is a plan view schematically showing a liquid crystal display device 3 of embodiment 3.

In embodiment 3, a circuit film and display device according to the first and second aspects of the present invention are described. FIG. 7 is a plan view schematically showing a liquid crystal display device 3 of embodiment 3. The elements same as those of embodiments 1 and 2 are denoted by the same reference numerals, and the descriptions thereof are herein omitted.

Elements of the circuit film and display device according to the first and second aspects of the present invention correspond to the following elements of embodiment 3:

Circuit film of the first and second aspects: first source SOF 62;
Second-circuit film: second source SOF 20;
Third-circuit film: first gate SOF 30a, second gate SOF 30b;
First circuit: first source driver IC 21a;
Second circuit: second source driver IC 21b;
Third circuit: first gate driver IC 31a, second gate driver IC 31b;
First signal line: first source line 14a;
Second signal line: second source line 14b;
Third signal line: first gate line 15a, second gate line 15b;
First input line: input line 23;
Second input line: source IC input line 24; and
Third input line: gate IC input line 25.

The liquid crystal display device 3 of embodiment 3 does not have the source PCB 40 of embodiment 2. A control signal which is to be supplied to the second source driver IC 21b of the second source SOF 20 is input from the liquid crystal panel 10. In other words, the second source SOF 20 has a relay line 26 for transferring a control signal to an adjacent third source SOF (not shown). The liquid crystal panel 10 has first and second panel side relay lines 13a and 13b. The first panel side relay line 13a connects a source IC input line 24 of a first source SOF 62 to the relay line 26 of an adjacent second source SOF 20. The second panel side relay line 13b connects the relay line 26 of the second source SOF 20 to a relay line of an adjacent third source SOF (not shown).

Figure 8:
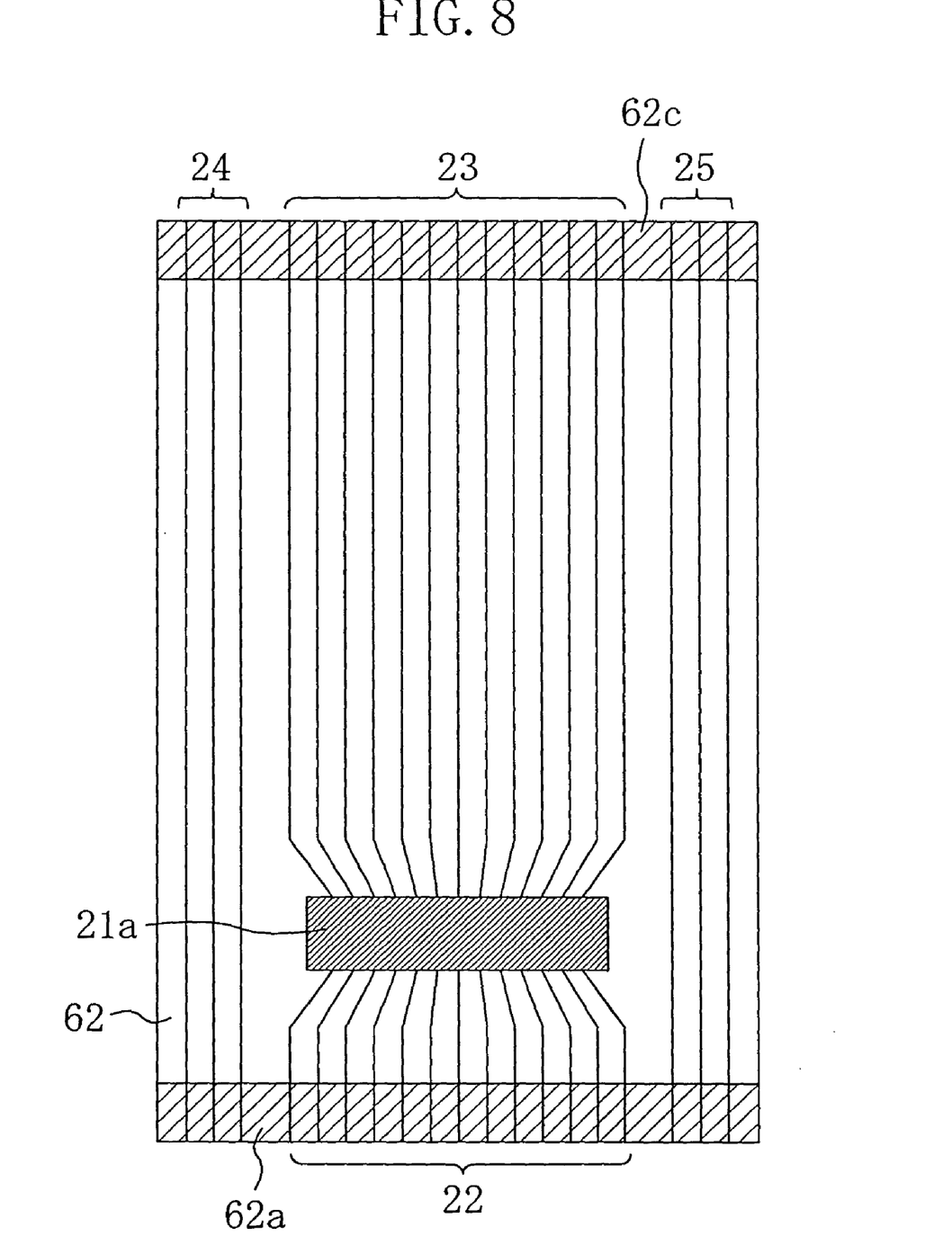
FIG. 8 is a plan view schematically showing a first source SOF 62 of embodiment 3.

FIG. 8 is a plan view schematically showing a first source SOF 62 of embodiment 3. The first source SOF 62 has a first source driver IC 21a, an output line 22, an input line 23, a source IC input line 24, a gate IC input line 25, a panel side terminal 62a, and a control board side terminal 62c as does the first source SOF 61 of embodiment 2. Thus, by connecting the first source SOF 62 of embodiment 3 to the liquid crystal panel 10 and the control board 80, a control signal is input to the first source driver IC 21a of the first source SOF 62, and a driving signal is output from the first source driver IC 21a to a first source line 14a of the liquid crystal panel 10. Meanwhile, a control signal is input to the gate driver IC 31 of the gate SOF 30, and a driving signal is output from the gate driver IC 31 to a gate line 15 of the liquid crystal panel 10.

Since the liquid crystal display device 3 of embodiment 3 does not have a source PCB, the first source SOF 62 does not have a PCB side terminal, and the source IC input line 24 extends from the control board side terminal 62c to the panel side terminal 62a. By connecting the first source SOF 62 to the liquid crystal panel 10, the source IC input line 24 is connected to the first panel side relay line 13a at the panel side terminal 62a. Thus, by connecting the first source SOF 62 to the control board 80, a control signal is input from the control board 80 to the source driver IC 21 through the first source SOF 62, and a driving signal is output from the source driver IC 21 to the source line 14 of the liquid crystal panel 10.

Hereinabove, preferred embodiments of the present invention have been described, but the technological extent of the present invention is not limited to the above examples. It will be appreciated by those skilled in the art that the above embodiments are merely exemplary, and other various combinations of the components and processes and variations thereof are possible within the scope of the present invention. For example, although one strip of first source SOF (60, 61, 62) is used in the above embodiments, two or more strips of first source SOFs may be used. This structure is applicable to a larger size liquid crystal panel 10. Although a PCB is used in the above embodiments, a flexible board, such as a FPC, or the like, may be used instead. When a flexible board is used, thermal stress which occurs when the flexible board is connected to a SOF is alleviated, and accordingly, a wire formed on the SOF is unlikely to be disconnected.

According to the present invention, a decrease in cost is possible by decreasing the number of components.

A circuit film of the present invention can be used for installation of peripheral circuits in a FPD module, such as a liquid crystal module, or the like. A display device of the present invention can be used for various electric devices. Examples of the electric devices in which a display device of the present invention can be used include portable cellular phones, PDAs (Personal Digital Assistants), personal computers, flat television panels, medical displays, car navigation systems, amusement apparatuses, etc.

What is claimed is:

1. A circuit film, comprising:
a film substrate;
a first circuit formed on the film substrate for outputting a driving signal to a display device, the display device including at least a display panel which has at least a first signal line and a second signal line, a second-circuit film which has a second circuit for outputting a driving signal to the second signal line, a wire board which has a second-circuit line for inputting a control signal to the second circuit, a control board for controlling at least the first and second circuits; and
a plurality of input lines formed on the film substrate,
wherein one end of the second-circuit film is connected to the wire board, and the other end of the second-circuit film is connected to the display panel,
the film substrate has a first region arranged to be connected to the control board, a second region arranged to be connected to the wire board, and a third region arranged to be connected to the display panel,
the plurality of input lines include at least a first input line for inputting a control signal to the first circuit and a second input line for inputting a control signal to the second-circuit line, and
the film substrate is directly connected through an anisotropic conductive film to each of the display panel, the wire board, and the control board such that a control signal is input from the control board to the first circuit through the first input line, and a control signal is input from the control board to the second circuit through the second input line and the second-circuit line.

2. The circuit film of claim 1, wherein:
the display panel further includes a third signal line;
the display device further includes a third-circuit film which has a third circuit for outputting a driving signal to the third signal line;
the control board further controls the third circuit; the display panel includes a third-circuit line for inputting a control signal to the third circuit;
the plurality of input lines further includes a third input line for inputting a control signal to the third-circuit line; and
the film substrate is connected to the display panel, the wire board, and the control board such that a control signal is input from the control board to the third circuit through the third input line and the third-circuit line.

3. A display device, comprising:
a display panel which has a first signal line and a second signal line;
a first-circuit film which has a film substrate and a first circuit formed on the film substrate for outputting a driving signal to the first signal line;
a second-circuit film which has a second circuit for outputting a driving signal to the second signal line;
a wire board which has a second-circuit line for inputting a signal to the second circuit; and
a control board for controlling the first and second circuits,
wherein the first-circuit film is the circuit film of claim 1 which has a first input line for inputting a control signal to the first circuit and a second input line for inputting a control signal to the second circuit, and
the film substrate is connected to the control board, the wire board, and the display panel such that a control signal is input from the control board to the first circuit through the first input line, and a control signal is input from the control board to the second circuit through the second input line and the second-circuit line.

4. A display device, comprising:
a display panel which has a first signal line, a second signal line, and a third signal line;

a first-circuit film which has a film substrate and a first circuit formed on the film substrate for outputting a driving signal to the first signal line;

a second-circuit film which has a second circuit for outputting a driving signal to the second signal line;

a wire board which has a second-circuit line for inputting a signal to the second circuit;

a third-circuit film which has a third circuit for outputting a driving signal to the third signal line; and a control board for controlling the first, second and third circuits, wherein the display panel further includes a third-circuit line for inputting a control signal to the third circuit, the first-circuit film is the circuit film of claim 2 which has a first input line for inputting a control signal to the first circuit, a second input line for inputting a control signal to the second circuit, and a third input line for inputting a control signal to the third circuit, and the film substrate is directly connected through an anisotropic conductive film to each of the control board, the wire board, and the display panel such that a control signal is input from the control board to the first circuit through the first input line, a control signal is input from the control board to the second circuit through the second input line and the second-circuit line, and a control signal is input from the control board to the third circuit through the third input line and the third-circuit line.

* * * * *